Patented Apr. 13, 1954

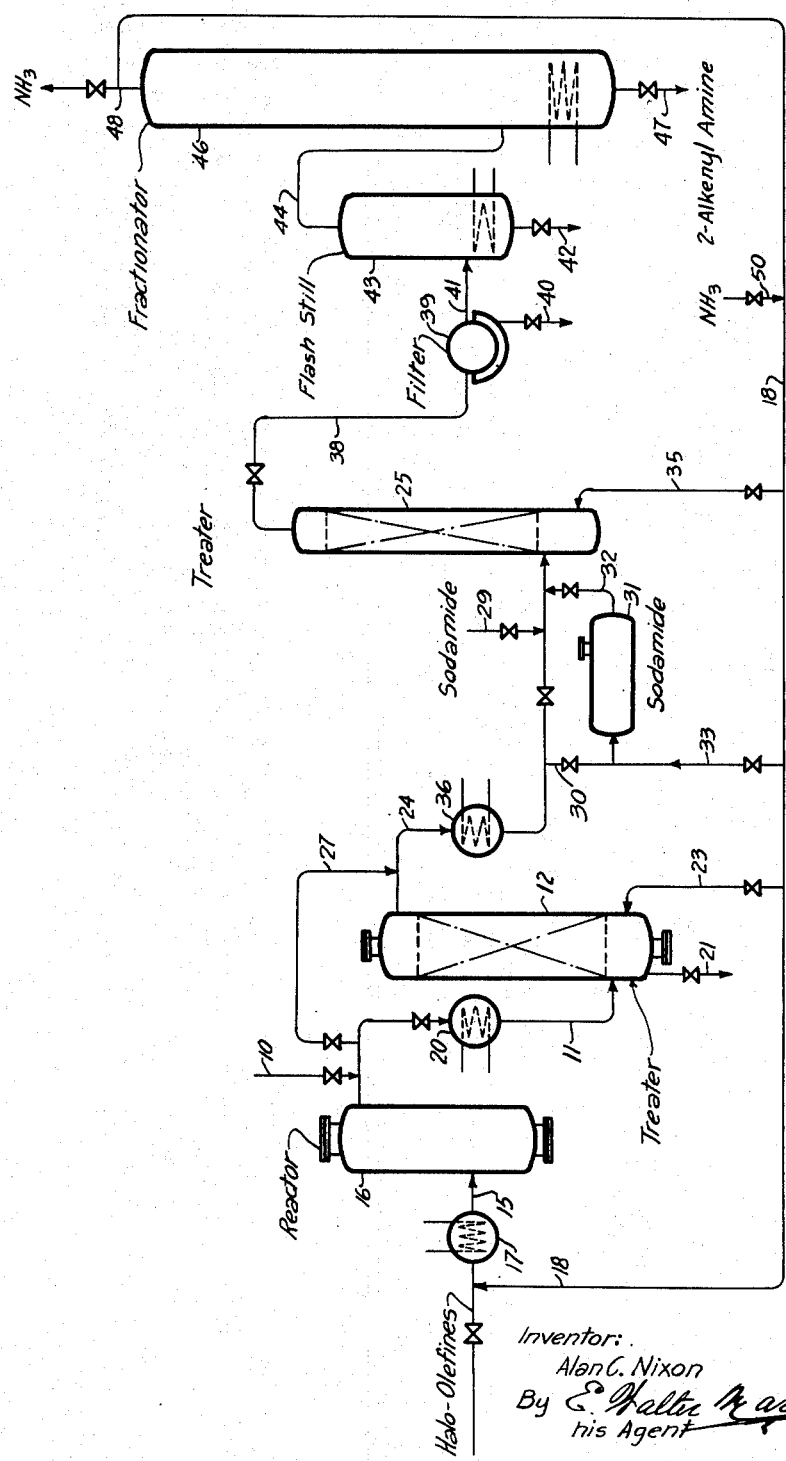

2,675,410

UNITED STATES PATENT OFFICE 2,675,410

PRODUCTION OF UNSATURATED ALKENYL AMINES

Alan C. Nixon, Berkeley, Calif., assignor to Shell Development Company, San Francisco, Calif., a corporation of Delaware Application May 1, 1950, Serial No. 159,168

8 Claims. (Cl. 260—583)

This invention relates to the production of 2-alkenyl amines from crude halo-olefin ammonolysis products. The invention relates more particularly to the purification of 2-alkenyl amine-containing olefin ammonolysis products comprising said 2-alkenyl amines in admixture with ammonia and 1-alkenyl halides. A particular aspect of the invention relates to the purification of methallyl amine-containing reaction mixtures comprising said methallyl amine in admixture with ammonia and isocrotyl chloride.

Production of 2-alkenyl amines by ammonolysis of halo-olefins by methods generally employed heretofore is often beset with difficulties militating against practical operation of the process. Such difficulties comprise, for example, a relative inability to separate efficiently the 2-alkenyl amine from the crude ammonolysis products. Separation of these mixtures as practiced heretofore not only renders exceedingly difficult the production of the 2-alkenyl halide in a high state of purity but often is accompanied by operational difficulties involving severe corrosion of apparatus surfaces. The latter difficulties render impossible the maintenance of constant optimum operating conditions, and necessitate either the use of costly non-corrosive materials of construction or the continued replacement of considerable portions of the equipment.

Treatment of the ammonolysis reactor effluence to effect the removal of hydrogen halide therefrom by such methods as washing with aqueous caustic solutions generally does not materially improve the operation of such processes. Such treatments, in introducing water into the system, increase the severity of the problem in that it renders more difficult the separation of residual ammonia from the 2-alkenyl amine. The relative volatility of ammonia with respect to the secondary amine such as, for example, methallyl amine, decreases progressively as the water concentration is increased.

At least a substantial part of the difficulties encountered heretofore in the separation of the 2-alkenyl amines from the ammonolysis reaction products is attributed directly to the presence therein of impurities comprising 1-alkenyl halides. The 1-alkenyl halides are generally introduced into the system as impurity in the 2-alkenyl-containing charge to the ammonolysis reaction zone. Readily available 2-alkenyl halides generally contain varying amounts of the corresponding 1-alkenyl halides. In the practical scale production of methallyl chloride this compound is generally obtained in admixture with isocrotyl chloride. Subjection of the contaminated 2-alkenyl halide charge to ammonolysis conditions effecting the conversion of the 2-alkenyl halide to the corresponding 2-alkenyl amine will usually not affect all of the contaminant 1-alkenyl halide present. The ammonolysis of methallyl chloride contaminated with isocrotyl chloride will generally result in the production of reaction products comprising methallyl amine in admixture with unreacted isocrotyl chloride.

Removal of the 1-alkenyl halide from the 2-alkenyl halide charge to the ammonolysis system by such means as fractionation is often highly impractical if not impossible due to the proximity of the boiling temperatures of corresponding alkenyl halides. Any substantially complete removal of the 1-alkenyl halide therefrom would then necessitate recourse to operational steps of a complexity and cost detracting materially from the practicality of the process.

It has now been found that the 2-alkenyl amines are recovered efficiently in a relatively high state of purity from the crude ammonolysis reaction products containing them in admixture with ammonia and the corresponding 1-alkenyl halide by contacting said crude reaction mixture with a member of the group consisting of the amides of the alkali metals and the nitrides of the alkaline earth metals at a temperature of from about 20° C. to about 200° C., and stripping ammonia from the resulting treated crude reaction mixture. In a preferred method of carrying out the invention the 2-alkenyl halide-containing, crude ammonolysis products are first brought into contact with a solid basic material in the absence of any substantial amount of added water in a first treating zone prior to subjection to contact with said amides or nitrides in a second treating zone.

The invention is applied to the separation of 2-alkenyl amines having from three to nine carbon atoms to the molecule from mixtures containing said amines in admixture with ammonia and 1-alkenyl halides having from three to nine carbon atoms to the molecule and which are separable only with difficulty from said mixture by ordinary practical scale fractionating means. The class of 2-alkenyl amines, also referred to as allyl-type amines, to the separation of which the present invention is directed comprise the grouping

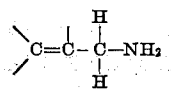

Representative examples of such 2-alkenyl amines comprise:

$$CH_2=CH-CH_2NH_2$$
$$CH_3-CH=CH-CH_2NH_2$$
$$CH_2=C(CH_3)CH_2NH_2$$
$$C_2H_5-CH=CH-CH_2NH_2$$
$$C(CH_3)_3-CH=CH-CH_2NH_2$$
$$CH_3-CH=C(CH_3)-CH_2NH_2$$
$$C_2H_5-CH=C(CH_3)-CH_2NH_2$$
$$(CH_3)_5-C(CH_3)=CH-CH_2NH_2$$

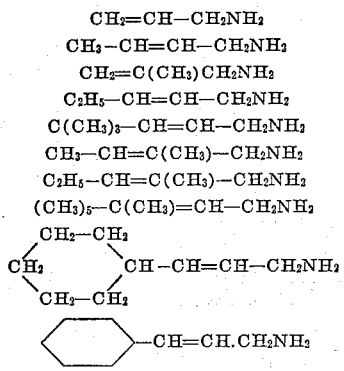

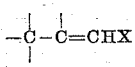—CH=CH.CH$_2$NH$_2$

The 1-alkenyl halides, also referred to as vinyl-type halides, having from three to nine carbon atoms to the molecule, contained in the 2-alkenyl amine-containing mixtures separated in accordance with the invention, comprise the grouping $$-\overset{|}{\underset{|}{C}}-\overset{|}{C}=CHX$$

wherein X represents a halogen. Examples of this class of alkenyl halides include:

$$CH_3-CH=CHCl$$
$$CH_3-C(CH_3)=CHCl$$
$$CH_3-CH=CHBr$$
$$CH_3-C(CH_3)=CHBr$$
$$CH_3-CH=CHI$$
$$C(CH_3)_3-CH_2-CH=CHCl$$

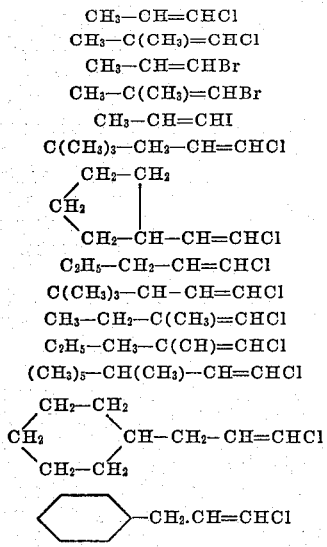

$$C_2H_5-CH_2-CH=CHCl$$
$$C(CH_3)_3-CH-CH=CHCl$$
$$CH_3-CH_2-C(CH_3)=CHCl$$
$$C_2H_5-CH_2-C(CH)=CHCl$$
$$(CH_3)_5-CH(CH_3)-CH=CHCl$$

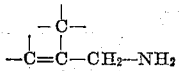—CH$_2$.CH=CHCl

The process of the invention is applied with particular advantage to the separation of the 2-alkenyl amines wherein the unsaturated carbon atom in the 2-position is a tertiary carbon atom, that is, those comprising the grouping:

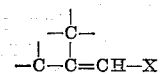

from mixtures containing the corresponding 1-alkenyl halides having the grouping:

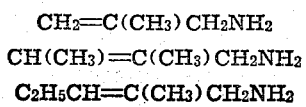

Examples of the members of this sub-class of 2-alkenyl amines comprise $$CH_2=C(CH_3)CH_2NH_2$$
$$CH(CH_3)=C(CH_3)CH_2NH_2$$
$$C_2H_5CH=C(CH_3)CH_2NH_2$$

etc. Examples of the members of the corresponding sub-class of 1-alkenyl halides comprise:

$$CH_3C(CH_3)=CHCl, CH_3C(CH_3)=CHBr$$
$$CH_3C(CH_3)=CHI, CH_2(CH_3)C(CH_3)=CH_2Cl$$
$$CH(CH_3)_2C(CH_3)=CH_2Cl$$
$$C(CH_3)_3C(CH_3)=CH_2Cl, etc.$$

The process of the invention is particularly effective in serving as a means for recovering the 2-alkenyl amines having four carbon atoms to the molecule from mixtures comprising them in admixture with the corresponding 1-alkenyl halides having four carbon atoms to the molecule. Mixtures containing such four carbon atom alkenyl amines and alkenyl halides treated in accordance with the invention comprise, for example, mixtures containing methallyl amine in admixture with ammonia and isocrotyl chloride, methallyl amine in admixture with ammonia and isocrotyl bromide, etc.

In the alkenyl halides described hereinabove, comprised in the mixture toward the treatment of which the present invention is directed, the halogen atom can be, for example, chlorine, bromine, or iodine. The invention is, however, applied with particular advantage to the treatment of the above-defined mixture wherein the halogen atom of the alkenyl halide component is a halogen having an atomic number of from 17 to 35, inclusive.

By the phrase "consisting essentially of" as used throughout the specification and attached claims it is intended to mean that the compositions to which it is applied are made up almost entirely of the components recited and that these components are the main and characterizing ones; but this expression does not exclude the presence of minor amounts of other constituents which are ordinarily found to be present in such compositions.

In order that the invention will be more readily understood it will be described herein with reference to the attached drawing wherein the single figure illustrates one form of apparatus suitable for executing the invention.

In accordance with the invention a mixture containing a 2-alkenyl amine in admixture with a corresponding 1-alkenyl halide, such as, for example, one containing methallyl amine in admixture with isocrotyl chloride, is taken from an outside source and forced through valved lines 10 and 11 into a first treating zone. The first treating zone may comprise, for example, a zone of enlarged cross-sectional area, such as a chamber 12.

Although not limited thereto, the invention is applied with advantage to the treatment of 2-alkenyl amine-containing mixtures obtained by the ammonolysis of halo-olefins. In such case the mixture will comprise besides the alkenyl amine and alkenyl halide a substantial amount of ammonia and a lesser amount of hydrogen halide such as, for example, hydrogen chloride. At least a substantial part of the hydrogen halide will be bound to the ammonia or amine as a hydrohalide.

The mixture of ammonolysis reaction products treated can emanate directly from a reaction zone wherein it is formed. Thus, a mixture of halo-olefins, for example, a mixture of 1-alkenyl halide and 2-alkenyl halide such as a mixture of methallyl chloride and isocrotyl chloride, taken from an outside source, may be forced through valved line 15 provided with heating means, such as heater 17, into a reaction zone comprising a reactor 16. Ammonia, or an ammonia-yielding gas, is introduced into reactor 16 from line 18 discharging into line 15. Within reactor 16 the mixture is subjected to conditions of ammonolysis resulting in the reaction of methallyl chloride with ammonia resulting in the formation of reaction products comprising methallyl amine. The invention is in no wise limited to the use of particular conditions of ammonolysis. Suitable conditions of ammonolysis comprise, for example, those set forth in U. S. Patent 2,216,548. The ammonolysis of methallyl chloride to methallyl amine generally will be selective leaving substantially all of the isocrotyl chloride unaffected. Effluence from reactor 16, comprising methallyl chloride, isocrotyl chloride, ammonia and hydrogen chloride, is passed through valved line 11 into chamber 12. Such charge introduced into the system through valved line 10, and/or that formed within reactor 16, may constitute the sole material charged to chamber 12 within the scope of the invention.

Within chamber 12 the mixture is contacted with a base material, in the substantial absence of any water added from an outside source, under conditions enabling the removal of substantially all hydrogen chloride, and any water which may be present, from the 2-alkenyl amine-containing stream charged thereto. A suitable basic material comprises, for example, the oxides and hydroxide of the alkali metals and alkaline earth metals, such as the oxide of calcium, barium, strontium, magnesium, sodium, potassium, the hydroxide of potassium, sodium, pithium, rubidium, calcium, barium, the oxide of zinc and the like. Conditions maintained within column 12 are controlled to maintain the temperature therein in the range of, for example, from about 20° to about 300° C. and preferably from about 80° to about 150° C. Suitable means, such as, for example, a heat exchanger 20, and optionally additional temperature controlling means not shown in the drawing, are provided to maintain desired conditions in chamber 12. Pressures within column 12 are sufficiently high to maintain at least a substantial part of the mixture undergoing treatment in the liquid phase. The treating agent is employed in the solid form such as a bed of chunks, lumps, pellets, powder, etc. of the agent and may be stirred or otherwise agitated and may move countercurrent to the stream of amine and ammonia. The use of the agent in the form of a slurry or solution in a non-aqueous solvent may be resorted to within the scope of the invention. Under the above-defined conditions substantially all water and hydrogen chloride entering chamber 12 will react with treating agent forming reaction products more readily removable from the treated mixture. When using calcium oxide as the treating agent in chamber 12 the reaction products resulting from the interaction of the calcium oxide with the hydrogen chloride, and with any water which may be present, will result in products which will concentrate in the lower part of column 12 and which are withdrawn therefrom by means of valved line 21. Treatment of the mixture with the basic material in chamber 12 is preferably effected in a substantial excess of ammonia. Additional amounts of ammonia can be introduced into a lower part of chamber 12 by means of valved line 23.

The efficiency with which the hydrogen halide is removed from the alkenyl amine-containing ammonolysis product is evidenced by the following example:

Example I

A methallyl amine-containing product obtained by the ammonolysis of isocrotyl chloride-contaminated methallyl chloride and which contained hydrogen chloride in the form of ammonium chloride in the ratio of ammonium chloride to total amine of 0.0152 was contacted in the liquid phase with calcium oxide at a temperature of 100° C. When calcium oxide was used in an amount equivalent to a mole ratio of calcium oxide to ammonium chloride of 1.85, it was found that ammonium chloride remaining in the treated product amounted to only 10.5% of that originally present in the untreated charge. In a repetition of the operation conducted under substantially identical conditions but with the exception that calcium oxide was present in an amount equivalent to a mole ratio of calcium oxide to ammonium chloride of 3.64, the treated product was found to contain only 4.4% of the ammonium chloride originally comprised in the untreated material.

The anhydrous, treated reaction mixture consisting essentially of methallyl amine, isocrotyl chloride and ammonia, is passed from chamber 12 through valved line 24 into a second treating zone comprising, for example, a chamber 25. When the mixture to be treated is free of any substantial amounts of hydrogen chloride and is substantially anhydrous, it can be charged directly to chamber 25. To this effect a valved line 27 is provided enabling the pasage of the charge introduced through valved line 10 and/or emanating from reactor 16, through lines 11 and 27 into line 24 leading into chamber 25.

In passing through valved line 24 sodium amide is added to the stream undergoing treatment. Although in the detailed description sodium amide is chosen as the agent added to the stream passing into chamber 25, it is to be understood that the invention is not limited to the use of this specific compound, and any agent may be added which is capable of reacting selectively with the 1-alkenyl halide component of the stream undergoing treatment. Thus, suitable agents which may be added to the stream flowing through valved line 24 comprise the amides and nitrides of the alkali metals and of the alkaline earth metals such as lithium nitride, potassium amide, rubidium amide, calcium amide and nitride, barium nitride, strontium nitride, etc., and also such amides and nitrides as zinc amide, magnesium nitride, etc. In addition, the free metals, where sufficiently reactive, may be added directly. The use of the amides of the alkali metals is somewhat preferred. The agent thus added to the stream passing through valved line 24 may be introduced by any suitable means illustrated in the drawing by valved line 29. The agent thus added may be introduced into the system in the form of powder, chunks, lumps, slurry, suspension, etc. A part of the stream flowing through valved line 24 may be by-passed through a valved line 30 through chamber 31 containing the agent capable of reacting with the isocrotyl chloride, such as, for example, sodamide. The diverted stream in passing through chamber 31 picks up the sodamide and is returned through valved line 32 into line 24. If desired, a part or all of the stream thus passed through chamber 31 to entrain the sodium amide may consist of a separate stream of ammonia introduced into chamber 31 by means of a valved line 33. The amount of liquid stream or streams thus passed through chamber 31 is controlled to obtain the desired concentration of the sodium amide in the total charge to chamber 25. Within chamber 25 the stream is subjected to agitation induced by the presence therein of suitable baffles, perforated plates, trays, packing or the like, to assure intimate contact of the components of the mixture therein with the added sodium amide. The invention is not limited to the use of any specific method of assuring intimate contact between the isocrotyl chloride and the added sodium amide. Means not shown in the drawing, such as, for example, mechanical stirring means, may be resorted to in order to obtain sufficient agitation. Mixing to the desired degree may also be aided by the injection of additional ammonia in the lower part of the column 25 through suitable means, such as, for example, valved line 35.

Conditions within chamber 25 are controlled to assure the substantially complete interaction of the 1-alkenyl-halide component of the mixture therein with the added sodium amide in the absence of any substantial decomposition of the 2-alkenyl amine. Suitable temperatures to be maintained within column 25 comprise, for example, a temperature in the range of from about 20° C. to about 200° C. and preferably from about 80° C. to about 150° C. The pressure within column 25 is preferably maintained sufficiently high to maintain at least a substantial part of the contents thereof in the liquid phase. The amount of sodium amide added to the charge to column 25 may vary considerably within the scope of the invention. In general, it has been found that the addition of the amide in an amount ranging, for example, from about 125 to about 300 mol per cent based on the 1-alkenyl halide and any water present is satisfactory. Higher or lower amounts may, however, be employed within the scope of the invention. The time of contact of the charge to column 25 with the treating agent therein will vary to some extent in accordance with the specific treating agent, nature of charge and conditions of temperature, etc. In general, a contact time of from about 5 to 60 minutes, and preferably from about 10 to 30 minutes, is employed. Higher and lower contact times may, however, be employed within the scope of the present invention.

The following example is illustrative of the efficiency with which the alkenyl amine is separated from the contaminant alkenyl halide in accordance with the invention:

Example II

Methallyl amine containing 0.5% by weight of isocrotyl chloride and 0.2% of water, which was obtained by the ammonolysis of isocrotyl chloride-contaminated methallyl chloride, was contacted in the liquid phase at a temperature of 100° C. with sodium amide. A contact time of 10 minutes was employed and sodium amide was used in an amount equal to a mole ratio of sodium amide to isocrotyl chloride of 4.6 (i. e. a mole ratio of sodium amide to isocrotyl chloride plus water of 1.5). Reaction occurred immediately upon addition of the sodium amide and small amounts of gas were given off. The liquid phase was separated by filtration from the mixture and filtrate and separated solids were analyzed. The analysis showed that 97.7% of the isocrotyl chloride had been removed from the methallyl amine-containing charge during the operation while 88% of the original chlorine in the sample was detected as inorganic chloride in the recovered solids.

The operation was repeated under substantially identical conditions with the exception that sodium amide was used in an amount equal to a mole ratio of sodium amide to isocrotyl chloride of 6.4 (i. e. a mole ratio of sodium amide to isocrotyl chloride plus water of 2:1) and the contact time was increased to 30 minutes. Analysis of the treated methallyl amine-containing product showed that 98.6% of the isocrotyl chloride had been removed from the charge while 94% of the original chlorine was detected as chloride ion in the recovered solids.

Under the above-defined conditions the alkenyl halide component such as the isocrotyl chloride present will react with the sodium amide to form reaction products comprising normally solid material, such as sodium chloride, which is entrained along with the charge, and 1-alkenyl amine generally innocuous to operation and product quality. The treated charge consisting essentially of methallyl amine and ammonia, and containing some higher boiling and solid materials including polymers, unreacted sodium amide, some entrained salts such as calcium chloride, sodium chloride, etc., is passed from column 25 through valved line 38 into suitable separating means, such as, for example, a filter 39 of any suitable type, enabling the separation of the solid materials from the methallyl amine-containing stream. Filtrate consisting essentially of methallyl amine and ammonia is passed from filter 39 through line 41 into a suitable distillation zone such as, for example, flash still 43. Within still 43 lower boiling materials comprising methallyl amine and ammonia are flashed from any higher boiling materials present comprising, for example, polymeric material, dissolved NaCl, sodium amide, complexes, etc. Overhead from the flash tower 43, consisting essentially of methallyl amine and ammonia, is passed from flash still 43 into a stripping zone comprising, for example, a stripping tower 46. Within stripping tower 46 overhead consisting essentially of ammonia is separated from liquid bottoms consisting essentially of methallyl amine free of any substantial amount of iscrotyl chloride. Separation of amonia within stripper 46 is effected efficiently in the absence of any substantial amount of corrosion and operational difficulties. Overhead from stripper 46 consisting essentially of ammonia, is passed through valved line 48. At least a part of such overhead taken from stripper 46 through line 48 is passed through valved line 18 and then diverted into one or more of the lines 15, 23, 33 and 35, to be used in the system as described above. A valved line 50 is provided for the introduction of a gaseous stream consisting essentially of ammonia or an ammonia-yielding gas, into the system.

The following example further illustrates the presently claimed invention:

Example III

The mixture obtained by subjecting isocrotyl chloride-contaminated methallyl chloride to ammonolysis, having the following approximate composition:

| | Moles |
|---|---|
| Ammonia | 100 |
| Methallyl amine | 2 |
| Isocrotyl chloride | 0.1 |
| Hydrogen chloride | 2 | is contacted with calcium oxide in the liquid phase at a temperature of 100° C. employing a contact time of 60 minutes and employing calcium oxide in an amount approximating the equivalent of a mole ratio of calcium oxide to hydrogen chloride (in the form of ammonium chloride) of about 3.6. The calcium oxide-treated product is freed of normally solid-containing heavier reaction products by stratification. The calcium oxide treated products are subjected to contact with sodium amide in the liquid phase at a temperature of 100° C. for 10 minutes. The sodium amide-treated products are freed of solids and higher boiling materials by filtration followed by flash distillation. The flash distillate is stripped free of ammonia resulting in the obtaining of methallyl amine bottoms having an isocrotyl chloride content of less than about 0.002% in the absence of any substantial operational difficulties. A recovery of about 98% of the methallyl amine charged is obtained.

For the purpose of clarity, parts of apparatus such as pumps, coolers, reboilers, condensers, valves, and the like, not essential to a complete understanding of the invention have been omitted from the drawing.

The invention claimed is:

1. The process for recovering methallyl amine from a mixture consisting essentially of methallyl amine in admixture with isocrotyl chloride which comprises contacting said mixture in the liquid phase with sodium amide at a temperature of from about 20° C. to about 200° C., thereby selectively reacting said isocrotyl chloride with sodium amide with the formation of normally solid reaction products comprising sodium chloride, and separating said methallyl amine from said normally solid reaction products.

2. The process for recovering methallyl amine from a mixture consisting essentially of methallyl amine in admixture with isocrotyl chloride which comprises contacting said mixture in the liquid phase with the amide of an alkali metal at a temperature of from about 20° C. to about 200° C., thereby selectively reacting said isocrotyl chloride with said amide with the formation of normally solid reaction products, and separating said methallyl amine from said normally solid reaction products.

3. The process for recovering methallyl amine from a mixture consisting essentially of methallyl amine in admixture with isocrotyl chloride which comprises contacting said mixture in the liquid phase with the amide of an alkali metal at a temperature of from about 80° C. to about 150° C., thereby selectively reacting said isocrotyl chloride with said amide with the formation of normally solid reaction products and separating said methallyl amine from said normally solid reaction products.

4. The process for recovering a 2-alkenyl amine having four carbon atoms to the molecule wherein the unsaturated carbon atom in the 2-position is a tertiary carbon atom from a mixture consisting essentially of said 2-alkenyl amine in admixture with a corresponding 1-alkenyl chloride having four carbon atoms to the molecule wherein the unsaturated carbon atom in the 2-position is a tertiary carbon atom which comprises contacting said mixture with sodium amide in the liquid phase at a temperature of from about 20° C. to about 200° C., thereby selectively reacting said 1-alkenyl chloride with said amide with the formation of normally solid reaction products, and separating 2-alkenyl amine from said normally solid reaction products.

5. The process for purifying a 2-alkenyl amine having four carbon atoms to the molecule contaminated by the presence therein of a 1-alkenyl chloride having four carbon atoms to the molecule which comprises contacting said contaminated 2-alkenyl amine with sodium amide in the liquid phase at a temperature of from about 20° C. to about 200° C., thereby selectively reacting said 1-alkenyl chloride with said amide with the formation of normally solid reaction products, and separating said 2-alkenyl amine from said normally solid reaction products.

6. The process for purifying a 2-alkenyl amine having from three to nine carbon atoms to the molecule wherein the unsaturated carbon atom in the 2-position is a tertiary carbon atom contaminated by the presence therein of a corresponding 1-alkenyl chloride having from three to nine carbon atoms to the molecule wherein the unsaturated carbon atom in the 2-position is a tertiary carbon atom, which comprises contacting said contaminated 2-alkenyl amine in the liquid phase with sodium amide at a temperature of from about 20° C. to about 200° C., thereby selectively reacting said 1-alkenyl chloride with said amide with the formation of reaction products comprising normally solid reaction products, and separating said 2-alkenyl amine from said normally solid reaction products.

7. The process for purifying a 2-alkenyl amine having from three to nine carbon atoms to the molecule wherein the unsaturated carbon atom in the 2-position is a tertiary carbon atom contaminated by the presence therein of a corresponding 1-alkenyl halide having from three to nine carbon atoms to the molecule wherein the unsaturated carbon atom in the 2-position is a tertiary carbon atom, which comprises contacting said contaminated 2-alkenyl amine in the liquid phase with the amide of an alkali metal at a temperature of from about 20° C. to about 200° C., thereby selectively reacting said 1-alkenyl halide with said amide with the formation of reaction products comprising normally solid reaction products, and separating said 2-alkenyl amine from said normally solid reaction products.

8. The process for purifying a 2-alkenyl amine having from three to nine carbon atoms to the molecule wherein the unsaturated carbon atom in the 2-position is a tertiary carbon atom contaminated by the presence therein of a corresponding 1-alkenyl halide having from three to nine carbon atoms to the molecule wherein the unsaturated carbon atom in the 2-position is a tertiary carbon atom, which comprises contacting said contaminated 2-alkenyl amine in the liquid phase with the amide of an alkali metal at a temperature of from about 80° C. to about 150° C., thereby selectively reacting said 1-alkenyl halide with said amide with the formation of reaction products comprising normally solid reaction products, and separating said 2-alkenyl amine from said normally solid reaction products.

References Cited in the file of this patent

UNITED STATES PATENTS

| Number | Name | Date |
| --- | --- | --- |
| 2,000,412 | Morrell et al. | May 7, 1935 |
| 2,056,867 | Pyman et al. | Oct. 6, 1936 |
| 2,172,822 | Tamele et al. | Sept. 12, 1939 |
| 2,216,548 | Converse | Oct. 1, 1940 |